United States Patent [19]

Faust et al.

[11] Patent Number: 5,246,688
[45] Date of Patent: Sep. 21, 1993

[54] PRODUCTION OF SILICA-BASED MFI ZEOLITES

[75] Inventors: Anne C. Faust, Mulhouse; Jean-Louis Guth, Brunstatt; Frederique Hoffner, Saint-Amarin; Jean-Michel Popa, Drancy, all of France

[73] Assignee: Rhone-Poulenc Chimie, Courbevoie, France

[21] Appl. No.: 752,015

[22] Filed: Aug. 29, 1991

[30] Foreign Application Priority Data

Aug. 29, 1990 [FR] France ................ 90 10761
Mar. 27, 1991 [FR] France ................ 91 03697
Mar. 27, 1991 [FR] France ................ 91 03698

[51] Int. Cl.$^5$ ............................................ C01B 33/34
[52] U.S. Cl. ................................ 423/704; 423/705; 423/709
[58] Field of Search ............ 423/326, 328, 704, 705, 423/709, 718; 156/DIG. 62

[56] References Cited

U.S. PATENT DOCUMENTS

| | | | |
|---|---|---|---|
| 3,941,871 | 3/1976 | Dwyer et al. | 423/326 |
| 4,564,511 | 1/1986 | Desmond et al. | 423/326 |
| 4,941,963 | 7/1990 | Valyoscik | 208/46 |
| 5,082,641 | 1/1992 | Popa et al. | 423/326 |
| 5,110,571 | 5/1992 | Corcoran, Jr. et al. | 423/326 |

FOREIGN PATENT DOCUMENTS

| | | |
|---|---|---|
| 1192891 | 9/1985 | Canada . |
| 1196903 | 11/1985 | Canada . |
| 0321177 | 6/1989 | European Pat. Off. . |
| 0094288 | 11/1983 | France . |
| 0292363 | 11/1988 | France . |
| 0337835 | 10/1989 | France . |
| 2116974 | 10/1983 | United Kingdom . |

*Primary Examiner*—Carl F. Dees
*Attorney, Agent, or Firm*—Burns, Doane, Swecker & Mathis

[57] ABSTRACT

MFI zeolites based on silicon oxide and, optionally, the oxides of titanium, germanium, zirconium and/or tin, are produced by (1) heating an aqueous, homogeneous reaction mixture which comprises (a) an $M_{2/n}SiF_6$ complex (I), wherein M is a cation of valency n, optionally, at least one $M_{2/n}T'F_6$ complex (II), wherein T' is titanium, zirconium, germanium and/or tin, (b) a reagent providing OH. ions by hydrothermal decomposition and a structuring agent (c), e.g., a tertiary amine or a quaternary ammonium compound, whereby a zeolite precipitate is formed therein, and (2) separating and calcining such precipitate to eliminate structuring agent from the pores and channels of the resulting zeolite.

31 Claims, No Drawings

PRODUCTION OF SILICA-BASED MFI ZEOLITES

BACKGROUND OF THE INVENTION

1. Field of the Invention

The present invention relates to an improved technique for the production of zeolites based on silicon oxide and, optionally, oxides of tetravalent elements, and, more especially to the production of silica based MFI zeolites.

The present invention also relates to improved technique for the production of MFI zeolites based on silica and oxides of such tetravalent elements as titanium, germanium, zirconium and/or tin.

2. Description of the Prior Art

The zeolites are known to be crystallized tectosilicates. Their structures include assemblies of $TO_4$ tetrahedra, which form a three dimensional network by sharing oxygen atoms. In zeolites of the aluminosilicate type, which are the most common, T represents tetravalent silicon and trivalent aluminum. The cavities and channels of molecular dimensions within this network receive the cations which compensate for the charge deficit resulting from the presence of trivalent aluminum in the tetrahedra. Trivalent elements such as gallium and, more rarely, boron or beryllium may be substituted for the aluminum.

The composition can be described by the general formula: $x_1M_1^{n1+}; x_2M_2^{n2+}..[(y_1T_1;y_2T_2..)O_2(y_1+y_2+..)]^{x-}z_1A_1; z_2A_2..$ wherein the variables within the square brackets represent the composition of the network in T elements, the other variables corresponding to the species in the micropores of the network: $M_1$, $M_2..$ are the compensating cations when x is larger than 0 and $A_1$, $A_2..$ represent water, ionic pairs or molecules. Particularly when the T elements are solely tetravalent, there are no negative charges in the network (x=0), and, hence, no compensating cations $M_1$, $M_2$...

Each type of zeolite has its own peculiar porous structure. The variation in the dimensions and shapes of the pores from one type to another results in changes in the adsorbent properties thereof.

Only molecules having certain dimensions and shapes can enter into the pores of any particular zeolite. These remarkable characteristics render zeolites particularly suitable for purifying or separating gas or liquid mixtures, for example for separating hydrocarbons by selective adsorption.

The chemical composition, particularly together with the nature of the elements present in the $TO_4$ tetrahedra and the nature of the exchangeable compensating cations, is also an important factor responsible for the selectivity of adsorption and especially in the catalytic properties of these materials. They are useful as catalysts or catalyst carriers in cracking, reforming or modifying hydrocarbons and in the synthesis of many molecules.

Many natural zeolites exist; these are aluminosilicates, the availability and properties of which do not always meet the requirements for industrial applications. Thus, a wide variety of zeolites essentially of the aluminosilicate type have been synthesized. These include A zeolites (U.S. Pat. No. 2,882,243), X zeolite (U.S. Pat. No. 2,882,244), Y zeolite (U.S. Pat. No. 3,130,007), L zeolite (FR-A-1,224,154), T zeolite (FR-A-1,223,775), ZSM5 zeolite (U.S. Pat. No. 3,702,886), ZSM12 zeolite (U.S. Pat. No. 3,832,449) and ZSM48 zeolite (EP-A-0,015,132).

Zeolites generally crystallize from an aqueous solution. However, their low solubility prevents the formation of substantial quantities of crystals if the reaction medium is only a slightly supersaturated solution, containing the T elements in the form of species which can polycondense to form the network of the zeolites. When the supersaturation of such a solution is increased, an amorphous gel is formed, the solid phase of which contains the majority of the T elements in the form of hydroxides and oxides.

The typical technique for synthesizing zeolites then comprises converting the gel to zeolite crystals by a hydrothermal process, employing a dissolution/recrystallization mechanism. The species constituting the crystals are renewed in the solution by polycondensation, through continuous dissolution of the solid phase of the gel, which serves as a reagent reservoir. This conversion is facilitated by the presence of mobilizing agents, $OH^-$ or $F^-$, which enable the polycondensable species to be transferred by the solution. The reaction medium also contains structuring agents, which are incorporated in the microporous space of the network during crystallization, thus controlling the construction of the network and assisting to stabilize the structure, through the interactions which are established.

This method of synthesis from a gel nevertheless present certain drawbacks, including the following:

(1) heterogenous composition and texture of the gel, which may effect variations in the composition and nature of the species produced in solution, through dissolution of the gel;

(2) generally incongruent dissolution;

(3) aging during the heating period, which reduces its reactivity;

(4) supersaturation of the solution, which is necessitated by the properties of the gel and which may vary according to the above factors;

(5) practical technical problems, i.e., difficulties in agitating a gel which may be very viscous and in obtaining a homogeneous temperature throughout the reaction medium;

(6) incorporation of particles of gel in the zeolite crystals during their growth, giving rise to heterogeneity in the crystal.

SUMMARY OF THE INVENTION

Accordingly, a major object of the present invention is the provision of an improved process for the preparation of MFI zeolites which avoids or conspicuously ameliorates the above disadvantages and drawbacks to date characterizing the state of this art.

Another object of the present invention is the provision of an improved process for preparing MFI zeolites which provides better control over the crystallization of the zeolite and more rapid kinetics of zeolite crystallization.

Yet another object of this invention is the provision of an improved process for preparing MFI zeolites that is different in principle from the prior art techniques and does not require a reaction medium which initially contains a nutritive gel.

Another object of this invention is the provisions of such improved process which is equally suitable for the preparation of zeolites essentially consisting of silica and for the preparation of zeolites based on silica and the oxides of such tetravalent elements as titanium, germanium, zirconium and/or tin.

In the following description of the invention T represents the tetravalent elements, including $Si^{4+}$ and $T'$; and $T'$ represents $Ti^{4+}$, $Ge^{4+}$, $Zr^{4+}$ and/or $Sn^{4+}$.

Briefly, the present invention features a process for preparing MFI zeolites based on silicon oxide and, optionally, oxides of tetravalent elements, comprising:

(i) preparing an aqueous, homogeneous reaction mixture which comprises (a) a silicon source in the form of a $M_{2/n}SiF_6$ complex (I) wherein M is a cation of valency n such as a proton, an alkali metal ion, an alkaline earth metal ion, a transition metal, an ammonium ion or quaternary ammonium, (b) optionally, one or more sources of tetravalent elements $T'$ in the form of $M_{2/n}G'F_6$ complexes (II), wherein M is as defined above and $T'$ is titanium, germanium, zirconium and/or tin, (c) a chemical agent (Mod) which provides $OH^-$ ions by hydrothermal decomposition under the following reaction conditions, and (d) a structuring agent (Str) which controls and stabilizes the formation of the zeolite;

(ii) heating such reaction mixture to a temperature of at least 120° C., to form a precipitate therein and separating said precipitate; and (iii) calcining said precipitate at a temperature above 450° C. to eliminate the structuring agent confined within the network of the resulting zeolite.

DETAILED DESCRIPTION OF THE PREFERRED EMBODIMENTS OF THE INVENTION

More particularly according to the present invention, in a preferred embodiment thereof, an additive (Adj) is included in the reaction mixture to control the speed of liberation of the $OH^-$ ions which are generated by thermal decomposition of the chemical agent, hereinafter described as the "pH modifier" (Mod).

The sources of the T element ($Si^{4+} + T'$) are present in the new reaction medium in completely soluble form. The polycondensable species are generated from these sources by hydrolysis reactions, when they are used to effect nucleation and growth of zeolite crystals. The hydrolysis reactions are initiated by a controlled increase of the pH of the solution. A soluble chemical agent known as the pH modifier is included in the reaction for this purpose, its hydrothermal decomposition providing the necessary OH anions.

As indicated above, soluble sources of the T elements are preferably fluorine-containing complexes of the $M_{2/n}TF_6$ type (III). In formula (III), M represents a cation of valency n such as a proton; an alkali metal ion, preferably sodium; an alkaline earth metal ion, preferably calcium; a transition metal from Group VIII of the Periodic Table, particularly elements having an atomic number from 25 to 30; an ammonium ion or quaternary ammonium.

In this latter event, more particularly compare the definition of (V) given below.

In said formula (III) complexes, n is preferably 1 or 2.

Exemplary formula (III) complexes are:

(i) fluosilicic acid or sodium, potassium, calcium, barium or ammonium fluosilicate;

(ii) sodium, potassium, rubidium, cesium, magnesium, calcium, copper, zinc or ammonium fluotitanate;

(iii) sodium, potassium, rubidium, cesium, or ammonium fluogermanate;

(iv) sodium, potassium, rubidium, cesium, magnesium, manganese, nickel, copper, zinc, cadmium or ammonium fluozirconate;

(v) sodium, potassium, magnesium, calcium, barium, manganese, cobalt, nickel, copper, zinc, silver, cadmium or ammonium fluostannate.

From a practical point of view, the complexes may be obtained by dissolving the oxides or hydroxides of the T elements in hydrofluoric acid.

The formula (III) fluorine-containing complexes are stable in an acid or slightly acid medium (pH below about 6).

According to the present invention, the fluorine containing complexes are hydrolyzed to hydroxylated complexes when the pH of the reaction medium is increased by reactions of the following type:

$$M_{2/n}TF_6 + mH_2O \rightleftharpoons M_{2/n}TF_{6-m}(OH)_m + mHF \quad (1)$$

$$M_{2/n}TF_{6-m}(OH)_m \rightleftharpoons TF_{4-m}(OH)_m + M_{2/n}F_2 \quad (2)$$

In the above equations, in the octahedral complex produced in equation (1), m is a number less than or equal to about 3 and greater than or equal to about 1 and in the tetrahedral complex produced in equation (2), m is a number ranging from about 2 to about 4.

The hydroxylated species formed are polycondensable and may be used to crystallize the zeolite.

One characteristic of the process of the invention is the control of the speed at which the polyhydroxylated species are formed and concentrated, by generating $OH^-$ ions in situ; these consume HF and displace the two above equilibria (1) and (2) to the right. A pH modifier, hereinafter referred to by the abbreviation (Mod), is used for this purpose. It decomposes at the temperature at which the zeolite is synthesized, by a reaction of type (3):

$$AB + H_2O \rightarrow AH + B^+ + OH^- \quad (3)$$

One example of such a pH modifier is urea, which is decomposed above 100° C. by the reactions:

$$O=C(NH_2)_2 + H_2O \rightarrow CO_2 + 2 NH_3 \quad (4)$$

$$2 NH_3 + 2 H_2O \rightleftharpoons 2 NH_4^+ + 2 OH^- \quad (5)$$

However, many other chemical species may serve the same function as urea. Exemplary thereof are substituted ureas, thiourea and substituted thioureas, cyanamide, substituted cyanamides, hexamethylene tetramine and melamine, whether used alone or in mixtures.

The substituted ureas and substituted thioureas are respectively ureas and thioureas which are substituted on the nitrogen by 1, 2, 3 or 4 saturated or unsaturated and/or aromatic aliphatic radicals.

Particularly exemplary such radicals include alkyl radicals having 1-4 carbon atoms, the allyl radical and/or the phenyl radical.

The following are exemplary substituted ureas and thioureas which are suitable according to the invention:

methylurea; symmetric dimethylurea; asymmetric dimethylurea; trimethylurea; tetramethylurea; ethylurea; N-methyl-N'-ethylurea; symmetric diethylurea; asymmetric diethylurea; triethylurea; tetraethylurea; n-propylurea; symmetric di-n-propylurea; tetra-n-propylurea; n-butylurea; symmetric di-n-amylurea; allylurea; symmetric diallylurea; asymmetric diallylurea; phenylurea; N-methyl-N'-phenylurea; N- methyl-N-phenylurea; N-ethyl-N'-phenylurea; N-ethyl-N-phenylurea; N,N-dimethyl-N'-phenylurea; symmetric diphenylurea; methylthiourea; symmetric dimethylthiourea; asymmetric dimethylthiourea; trimethylthiourea; tetramethylthiourea; ethylthiourea; N-methyl-N'-ethylthiourea; N,N-dimethyl-N'-ethylthiourea; symmetric diethylthiourea; asymmetric diethylthiourea; triethylthiourea; tetraethylthiourea; n-propylthiourea; N-methyl-N'-n-propylthiourea; N-ethyl-N'-n-propylthiourea; symmetric di-n-propylthiourea; asymmetric di-n-propylthiourea; N-ethyl-N,N-'di-n-propylthiourea; n-butylthiourea; i-butylthiourea; d-sec.butylthiourea; tert.butylthiourea; allylthiourea; N-methyl-N'-allylthiourea; N,N-dimethyl-N'-allylthiourea; N-ethyl-N'-allylthiourea; N,N-diethyl-N'-allylthiourea; symmetric diallylthiourea; phenylthiourea; symmetric diphenylthiourea.

The substituted cyanamides are cyanamides which are substituted on a nitrogen atom by one or two aliphatic and/or aromatic radicals as defined above. Particularly exemplary such substituted cyanamides include methylcyanamide; dimethylcyanamide; ethylcyanamide; diethylcyanamide; di-n-propylcyanamide; di-n-butylcyanamide; allylcyanamide; diallylcyanamide; phenylcyanamide and diphenylcyanamide.

In another embodiment of the invention, an additive (Adj) is added to the reaction mixture, to control the speed of liberation of the OH$^-$ ions, which are generated by thermal decomposition of the chemical agent described as the "pH modifier" (Mod).

For the purpose of adapting the speed at-which the pH is increased and its final value to the speed at which the polycondensable hydroxylated species are formed and their concentration, it may be advantageous to change the speed at which the pH modifiers are hydrolyzed and to limit the concentration of OH$^-$ anions obtained. It is then advantageous to include an additive (Adj) in the reaction medium. The additive may, for example, be formaldehyde which will decrease the speed of the decomposition of the pH modifier, e.g. by forming urea/formaldehyde oligomers, or salts such as ammonium chloride which will limit the concentration of OH. anions obtained.

Structuring agents suitable for carrying out the invention include:

(i) tertiary amines of the formula (IV):

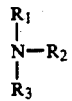
(IV)

wherein $R_1$, $R_2$, and $R_3$, which may be identical or different, are each a straight or branched alkyl radical having 1 to 6 carbon atoms, preferably a propyl or butyl radical;

(ii) quaternary ammonium salts of the formula (V):

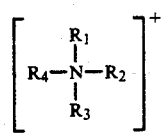
(V)

wherein $R_1$, $R_2$, $R_3$, and $R_4$, which may be identical or different, are each a straight or branched alkyl radical having 1 or 6 carbon atoms, preferably propyl or butyl radicals; and (iii) compounds of the formulae (IV) and (V) wherein the nitrogen atom has been replaced by a phosphorus atom.

In a preferred embodiment of the invention, the structuring agents are compounds which provide tetrapropylammonium or tripropylammonium cations.

The structuring agent is advantageously included in the reaction mixture in the form of the quaternary ammonium salt of formula (V) or the amine of formula (IV).

The reaction mixture has the following composition, expressed as a molar ratio:

Mod/(SiF$_6^{2-}$+T'F$_6^{2-}$), with Mod=pH modifier, from 0.25 to 8.0 and preferably from 1.0 to 4.0, Str/(SiF$_6^{2-}$+T'F$_6^{2-}$), with Str=structuring agent, from 0.04 to 3.0 and preferably from 0.08 to 1.5, H$_2$O/(SiF$_6^{2-}$+T'F$_6^{2-}$), from 15 to 300 and preferably from 25 to 200, Adj/(SiF$_6^{2-}$+T'F$_6^{2-}$), with Adj=additive to pH modifier, from 0 to 8.0 and preferably from 0 to 6.0.

In another embodiment of the invention, zeolites are prepared based on silica and oxides of tetravalent elements. In this event, the quantity of tetravalent element T' (T'=Ti, Ge, Zr and/or Sn) is such that the molar ratio of T'F$_6^{2-}$/(SiF$_6^{2-}$+T'F$_6^{2-}$) is from 0.001 to 0.50 and preferably from 0.005 to 0.25.

In a practical embodiment of the invention, the various reagents are mixed at ambient temperature, usually at from 15° to 25° C.

The pH of the reaction medium before heating advantageously ranges from 0 to 6.5 and preferably from 2 to 5.5. It may be adjusted by adding an acid or a base.

It is preferable to use an aqueous ammonia solution. If the base used is organic, it must have weak structuring agent properties, such as not to compete with the structuring agent added.

Exemplary such bases include methylamine, dimethylamine, trimethylamine, ethylamine, diethylamine and triethylamine.

To permit rapid crystallization without intermediate gel formation, MFI zeolite crystals may be dispersed in the reaction medium, in a proportion of up to 50% of the equivalent weight of silica SiO$_2$ contained in the source M$_{2/n}$SiF$_6$.

Any MFI zeolites may be used as crystal nuclei, regardless of their chemical composition. It is preferable to use a zeosilite, namely, an MFI zeolite which contains only silicon in its network.

The zeolite is crystallized by heating the reaction medium at a temperature of from 120° to 250° C. and preferably from 140° to 200° C. for the period of time required for crystallization, according to conventional technique for synthesizing a zeolite.

Advantageously, the heating time may range from 2 to 200 hours.

Heating and crystallization are preferably carried out in a receptacle or autoclave provided with a coating of, for example, polytetrafluorethane.

The reaction mixture either may or may not be agitated.

After the heating stage, the pH of the medium advantageously ranges from 6.5 to 12.0 and preferably from 7.0 to 10.0.

The process for preparing the zeolites according to the invention, by crystallizing a zeolite from a homogeneous medium, may be carried out under conditions of terrestrial gravity, or under a microgravity or even in a state of weightlessness.

The desirable effects which can be attained from conducting the crystallization in a state of weightlessness are the following:

(i) no sedimentation of crystals during their formation; this suggests that the crystals grow steadily, since growth is disrupted by sedimentation, (ii) no convection currents resulting in collisions between crystals with concomitant formation of new nuclei via the "breeding" phenomenon.

By "weightlessness" is intended a state in which the effects of weight and gravity are eliminated. A body is in a state of weightlessness when it is no longer attracted by terrestrial forces.

A state of weightlessness can be attained when the force of terrestrial attraction is compensated for, for example, by placing the object into celestial orbit; centrifugal force then compensates for the force of terrestrial attraction (satellite orbit).

According to the present invention, the crystallization stage may be carried out under normal conditions of terrestrial gravity. In this case, the intensity g of the weight, which also measures the acceleration of the free fall movement of a weighty body, is on the order of 9.808 m/s$^2$. It should be noted that g varies according to the latitude and altitude of the object. The value given as an illustration is defined for sea level at the latitude of the city of Paris.

According to the invention, $g_i$ may be less than the acceleration due to terrestrial attraction (gravity). The lower limit is not critical and may be close to zero. From a practical point of view, $g_i$ advantageously ranges from $10^{-6}$·g to g and preferably from $10^{-5}$·g to g. This range is given for purposes of illustration only.

After the crystallization stage on earth or in space, the crystals are separated on earth, by conventional methods of solid/liquid separation, particularly by filtering or centrifuging.

The crystalline precipitate is advantageously washed to remove impurities and particularly cations or anions which are not attached or incorporated within the structure of the zeolite.

The precipitate obtained, described as a "zeolite precursor", is a crystalline material of the type of a zeolite based on silica and, optionally, on oxides of tetravalent elements T' having the following general formula (VI):

$$(Si_{96-x}T_x)O_{192}, 4\pm 1 \ (S^+F^-) \qquad (VI)$$

wherein x ranges from 0 to 12.0 and preferably from 0 to 6.0; T represents Si$^{4+}$ and the following tetravalent elements T': Ti, Ge, Zr and/or Sn; and S$^+$ represents the cation emanating from the structuring agent.

S$^+$ more particularly represents a cation resulting from the formula (IV) amine, a cation of the formula (V) quaternary ammonium type, or these same compounds in which the nitrogen atom is replaced by a phosphorus atom.

In cases where the zeolite prepared essentially comprises silica, said zeolite precursor is a crystalline product of the silica based zeolite type having the following general formula (VIa):

$$Si_{96}O_{192}, 4\pm 1 \ (S^+F^-) \qquad (VIa)$$

wherein S$^+$ represents the cation emanating from the structuring agent.

In cases where the zeolite prepared is one comprising silica and oxides of tetravalent elements, said zeolite precursor is a crystalline product of the type of a zeolite based on silica and oxides of tetravalent elements T' having the following general formula (VIb):

$$(Si_{96-x}T'_x)O_{192}, 4\pm 1 \ (S^+F^-) \qquad (VIb)$$

wherein x is less than 12.0 and preferably ranges from 0.1 to 6.0; T' represents the tetravalent elements, Ti, Ge, Zr, and/or Sn; and S$^+$ represents the cation emanating from the structuring agent.

The formula (VI) zeolite precursors are easy to handle and are subjected to a calcining operation, thus producing a zeolite therefrom.

It is also possible to carry out a drying step before calcination, generally at atmospheric pressure, at a temperature of from 30° to 100° C.

Calcination then follows, comprising heating the precipitate, which may have been dried, to a temperature over 450° C. and preferably over 500° C., in order to decompose the organic species contained therein, such as the structuring agent.

An MFI zeolite is obtained, based on silica and optionally, oxides of tetravalent elements T, and having the following general formula (VII):

$$(Si_{96-x}T_x)O_{192} \qquad (VII)$$

wherein x ranges from 0 to 12.0 and preferably from 0 to 6.0; T' represents Si$^{4+}$ and the following tetravalent elements T': Ti, Ge, Zr and/or Sn.

According to this invention, it is possible to produce a silica based MFI zeolite having the following formula (VIIa):

$$Si_{96}O_{192} \qquad (VIIa)$$

or an MFI zeolite based on silica and oxides of tetravalent elements T' of the following formula (VIIb):

$$(Si_{96-x}T'_x)O_{192} \qquad (VIIb)$$

wherein x is less than 12.0 and preferably ranges from 0.1 to 6.0; and T' represents the tetravalent elements Ti, Ge, Zr and/or Sn.

The MFI zeolites prepared by the process of the invention may be identified, in particular, by plotting the X-ray diffraction diagram of the precursor from which they are produced.

The zeolite precursors of the invention have an orthorhombic crystalline system and an X-ray diffraction diagram as set forth in Table I.

Table I reports the extreme values of the various reticular intervals (equidistances) $d_{hkl}$. These correspond to the minimum and maximum concentrations (concentrations limits) of the element T' incorporated in the network of the zeolite before calcination, or more specifically to the ratio T'/(Si+T'), with T'=Ti$^{4+}$, Ge$^{4+}$, Zr$^{4+}$ and/or Sn$^{4+}$.

The diffraction diagram may be obtained with a diffractometer, using the conventional method of powders with K' radiation of copper. The reticular intervals $d_{hkl}$ characteristic of the sample are calculated from the position of the diffraction peaks represented by the angle 2θ, by the Bragg equation. The measuring error $\Delta(d_{hkl})$ out of $d_{hkl}$ is estimated as a function of the absolute error $\Delta$ (2θ) of $\pm 0.2°$ is currently allowed. The relative intensity I/Io assigned to each value of $d_{hkl}$ is estimated from the height of the corresponding diffraction peak. A scale of symbols is often used to characterize that intensity: FF=very strong, F=strong, mF=moderate to strong, m=moderate, mf=moderate to weak, f=weak.

The value of the volume $v_o$ of the crystallographic mesh of the zeolite before calcination is a function of the substitution of silicon by the element T'.

The principal lines obtained are recorded in Table I below.

The zeolites produced by the process of the invention may be used to catalyze many reactions, such as dismutation or alkylation reactions, hydrogenolysis and hydrogenation of petroleum cuts, or in reforming processes.

Zeolites produced according to the invention are perfectly suitable for use as catalysts in reactions in which phenols and phenol ethers are hydroxylated. In this respect, also compare published French Patent Application No. 87 15247, hereby expressly incorporated by reference.

TABLE I

| X-Ray Diffraction Diagram: | |
|---|---|
| Extreme values of $d_{hkl}$(nm) | $I/I_o$ |
| 1.112–1.132 | F |
| 0.994–1.014 | F |
| 0.969–0.983 | mF |
| 0.894–0.908 | mf |
| 0.740–0.752 | m |
| 0.701–0.713 | f |
| 0.666–0.677 | f |
| 0.629–0.639 | m |
| 0.601–0.611 | mf |
| 0.592–0.603 | m |
| 0.566–0.576 | m |
| 0.552–0.562 | m |
| 0.494–0.503 | mf |
| 0.455–0.464 | mf |
| 0.439–0.448 | f |
| 0.432–0.440 | mf |
| 0.421–0.429 | m |
| 0.397–0.404 | mf |
| 0.390–0.397 | f |
| 0.380–0.387 | FF |
| 0.372–0.379 | mF |
| 0.369–0.375 | mF |
| 0.362–0.368 | mF |
| 0.356–0.362 | f |
| 0.343–0.349 | f |
| 0.340–0.346 | m |
| 0.330–0.336 | mf |
| 0.328–0.334 | mf |
| 0.322–0.327 | f |
| 0.301–0.306 | m |
| 0.294–0.299 | m |
| 0.291–0.296 | mf |
| 0.271–0.275 | f |
| 0.258–0.262 | f |
| 0.254–0.258 | f |
| 0.248–0.252 | f |
| 0.246–0.250 | f |
| 0.238–0.241 | f |
| 0.237–0.240 | f |
| 0.199–0.201 | mf |

TABLE I-continued

| X-Ray Diffraction Diagram: | |
|---|---|
| Extreme values of $d_{hkl}$(nm) | $I/I_o$ |
| 0.198–0.200 | m |

In order to further illustrate the present invention and the advantages thereof, the following specific examples ar given, it being understood that same are intended only as illustrative and in nowise limitative.

EXAMPLE 1

A series of tests (1a to 1e) was carried out to produce silica based zeolites by a technique which employed a pH modifier (urea or cyanamide), but no additive.

The reaction mixtures formed corresponded to the molar compositions reported in Table II. The quantities used in each test represented 1/15th of the composition indicated in moles.

The solutions of the reaction mixtures were obtained by dissolving, in water:

(i) a silicon source: $(NH_4)_2SiF_6$ over 98% by weight, marketed by PROLABO, (ii) a structuring agent: tetrapropylammonium bromide $Pr_4NBr$ over 98%, marketed by FLUKA, and (iii) a pH modifier, which was urea (over 99.5%, MERCK) in tests 1a to 1d and cyanamide (over 98%, MERCK) in test 1e.

The initial pH of the solutions was adjusted to the value reported in Table II by adding a few drops of 28% ammonia.

The seed nuclei, when used in certain tests, were finely ground MFI zeolite crystals (namely, a zeosilite). The quantities thereof, indicated as percentages in Table II, relate to the mass of silica $SiO_2$ contained in the $(NH_4)_2SiF_6$ used.

The reaction mixtures were heated in autoclaves coated with polytetrafluoroethane, at the temperatures and for the times (in days) reported in Table II.

The results obtained are reported in Table II: the yield $\rho$ of solids collected was calculated relative to the $SiO_2$ used, and the zeolite crystallization rate is expressed as a percentage by weight.

TABLE II

| Example | pH Modifier | $(NH_4)_2SiF_6$ | $Pr_4NBr$ | Modifier | $H_2O$ | Nuclei | pHi | Agit | t °C. | Time | pHf | Yield | MFI |
|---|---|---|---|---|---|---|---|---|---|---|---|---|---|
| 1a | urea | 1 | 0.125 | 1 | 50 | — | 5 | yes | 170 | 1 d | 8 | 20% | 90% |
| 1b | urea | 1 | 0.125 | 2 | 50 | 2% | 3 | no | 170 | 1 d | 9 | 50% | 90% |
| 1c | urea | 1 | 0.125 | 2 | 50 | 10% | 3 | yes | 200 | 1 d | 9 | 60% | >95% |
| 1d | urea | 1 | 0.195 | 3 | 200 | 2% | 3 | yes | 200 | 1 d | 8 | 70% | 85% |
| 1e | cyanamide | 1 | 0.125 | 2 | 100 | 1% | 4.5 | no | 170 | 3 d | 8.5 | 55% | 85% |

The definitions of the abbreviations in Table II are as follows:

(a) Modifier: pH modifier
(b) pHi: initial pH
(c) pHf: final pH
(d) Agit: agitation
(e) t°C. temperature in °C.

Chemical analysis of the samples, when the impurities had been removed by dissolving the sample in boiling water, corresponded to formula (VI), and the X-ray diffraction spectrum of which was as shown in Table I.

EXAMPLE 2

A series of 5 tests was carried out, evidencing that it was possible to include additives (Adj) for the purpose of changing the speed at which the pH was increased, in order to produce purer crystals.

The tests were carried out according to the procedure of Example 1, using 2% of nuclei.

Table III reports the number of moles of pH modifier or additive included in a reaction mixture which contained $1(NH_4)_2SiF_6$, 0.1 $Pr_4NBr$ and 100 $H_2O$.

The quantities used per test corresponded to 1/15th of the composition indicated below, expressed in moles.

The reaction mixtures were heated without agitation, in an autoclave at 170° C. for 2 days.

The results obtained are reported in Table III.

TABLE III

| Example | Ph MODIFIER | ADDITIVE | MOLAR COMPOSITION | | OPERATING CONDITIONS | | RESULTS | |
|---|---|---|---|---|---|---|---|---|
| | | | MOD | ADJ | pHi | pHf | Yield | % MFI |
| 2a | UREA | — | 1.3 | — | 3.5 | 8.0 | 35 | 85% |
| 2b | UREA | FORMALDEHYDE | 1.3 | 1.0 | 3.0 | 8.0 | 40 | >95% |
| 2c | CYANAMIDE | — | 1.0 | — | 3.5 | 8.5 | 35 | 85% |
| 2d | CYANAMIDE | FORMALDEHYDE | 1.0 | 1.0 | 3.0 | 8.0 | 35 | >95% |
| 2e | MELAMINE | FORMALDEHYDE | 1.0 | 1.0 | 3.0 | 7.5 | 50 | >95% |

From Table III, it will be seen that the presence of the additive increased the rate of crystallization of the zeolite.

In this example, an MFI zeolite based on silicon oxide was prepared in a homogeneous medium by two methods; one method was to carry out the procedure in a state of weightlessness (3a) and the other under the influence of gravity (3b).

Two identical reaction mixtures 3a and 3b were prepared by the method described below.

The following materials were dissolved successively in 7.2 g of distilled water:

(i) 0.712 g of 99.99% by weight $(NH_4)_2SiF_6$ marketed by ALDRICH, (ii) 0.532 g of tetrapropylammonium bromide, $Pr_4NBr$ marketed by FLUKA, and (iii) 0.504 g of cyanamide, $HN\!=\!C\!=\!NH$ marketed by FLUKA.

The composition of the reaction medium in moles was as follows:

1 $(NH_4)SiF_6$; 0.5 $Pr_4NBr$; 3 $NH\!=\!C\!=\!NH$ and 100 $H_2O$.

The two solutions obtained, 3a and 3b, were transferred quantitatively to two autoclaves coated with polytetrafluoroethane, having a nominal capacity of 18 ml. The fill ratio was thus about 45%.

The two autoclaves were maintained at ambient temperature for 10 days. The autoclave containing solution 3a was then placed in a state of weightlessness at 23°+/−5° C. on a satellite (microgravity=$10^{-5}$.g), then one day later heated at 170° C. for 68 hours (the time required to increase the temperature to 170° C. being 2 hours, 40 minutes). It was then cooled to a temperature of 23°+/−5° C. over 28 hours. It was maintained in a state of weightlessness for 9 days at this latter temperature before being returned to earth, and was opened two days after its return.

The autoclave containing solution 3b was subjected to the same operations and with the same chronology as the first autoclave, except that the entire procedure was carried out on earth under normal gravity.

When the two autoclaves were opened, their contents were filtered and the solids recovered were analyzed by various techniques (microscopy, X-ray, chemical analysis). The results are reported in Table IV below.

The pH of the solutions changed from 4 to 9 order the course of synthesis.

TABLE IV

| | 3a | | 3b | |
|---|---|---|---|---|
| Quantity of solid collected | 0.149 g | | 0.166 g | |
| Morphology-Prisms and nature of phases-Prisms | L = 400–500μ<br>W = T = 150–200μ<br>L = 100–200μ<br>W = T = 50–150μ | MFI structure | -Prisms L = 400–500μ<br>W = T = 150–200μ<br>-Prisms L = 100–200μ<br>W = T = 50–150μ | MFI structure |
| | -Prisms L = 10–80μ combined in plates | | | |
| | -Spherical particles dia. 2–5μ in a mass (infrequent) | amorphous | -Spherical particles dia. 2–5μ in a mass (frequent) | amorphous |
| | -Plates (infrequent) 100 × 50μ | soluble | -Plates (frequent) 100 × 60μ | soluble |
| Chemical composition of prisms | $(SiO_2)_{96.4}Pr_4NF$ | | $(SiO_2)_{96.4}Pr_4NF$ | |

L = length, W = width, T = thickness of prisms, dia. = diameter

EXAMPLE 4

A series of tests (4a to 4j) was carried out for the preparation of zeolites based on silica and titanium dioxide by a method employing a pH modifier (urea or cyanamide) but without any additive.

The reaction mixtures prepared corresponded to the molar compositions reported in Table V. The quantities used in each test represented 1/15th of the composition, indicated in moles.

The solutions of the reaction mixtures were obtained by dissolving in water:

(i) a silicon source: over 98% by weight $(NH_4)_2SiF_6$ marketed by PROLABO, (ii) a titanium source: $H_2TiF_6$ in 60% aqueous solution, marketed by ALFA, (iii) a structuring agent: over 98% tetrapropylammonium bromide $Pr_4NBr$, marketed by FLUKA, and (iv) a pH modifier, which was urea (over 99.5%, MERCK) in tests 4a to 4i and cyanamide (over 98%, MERCK) in test 4j.

The initial pH of the solutions was adjusted to the value reported in Table V by adding a few drops of 28% ammonia.

The seed nuclei, when used in certain tests, were finely ground crystals of MFI zeolites. The quantities thereof, indicated as percentages in Table V, relate to the mass of silica $SiO_2$ contained in the $(NH_4)_2 SiF_6$ used.

The reaction mixtures were heated in autoclaves coated with polytetrafluoroethane, at the temperatures and for the time (in days) indicated in Table V.

TABLE V

| Example | pH Modifier | MOLAR COMPOSITIONS | | | | | OPERATING CONDITIONS | | | | | | RESULTS | |
|---|---|---|---|---|---|---|---|---|---|---|---|---|---|---|
| | | $(NH_4)_2SiF_6$ | $H_2TiF_6$ | $Pr_4N$ Br | Mod | $H_2O$ | Nuclei | pHi | Agit | t °C. | Time | pHf | Yield $\rho$ | M I |
| 4a | urea | 1 | 0.15 | 0.125 | 1 | 50 | 1% | 5 | no | 170 | 1 d | 8 | 20% | 85% |
| 4b | urea | 1 | 0.15 | 0.125 | 2 | 50 | — | 3 | no | 170 | 1 d | 9 | 50% | 35% |
| 4c | urea | 1 | 0.15 | 0.125 | 2 | 50 | 2% | 3 | no | 170 | 1 d | 9 | 55% | 80% |
| 4d | urea | 1 | 0.15 | 0.125 | 2 | 50 | 10% | 3 | no | 170 | 1 d | 9 | 55% | >95% |
| 4e | urea | 1 | 0.1 | 0.125 | 2 | 50 | — | 3 | yes | 200 | 1 d | 9 | 50% | 50% |
| 4f | urea | 1 | 0.1 | 0.125 | 2 | 50 | 2% | 3 | yes | 200 | 1 d | 9 | 50% | >95% |
| 4g | urea | 1 | 0.1 | 0.125 | 2 | 200 | 2% | 3 | yes | 200 | 1 d | 7.5 | 50% | 90% |
| 4h | urea | 1 | 0.05 | 0.195 | 3 | 200 | 2% | 3 | yes | 200 | 1 d | 8 | 65% | 85% |
| 4i | urea | 1 | 0.25 | 0.5 | 2 | 100 | 1% | 3 | no | 170 | 3 d | 8.5 | 60% | 75% |
| 4j | cyanamide | 1 | 0.25 | 0.125 | 2 | 100 | 1% | 4.5 | no | 170 | 3 d | 8.5 | 50% | 80% |

The results obtained are reported in Table V: the yield $\rho$ of solid collected was calculated relative to the sum of $SiO_2+TiO_2$ used, and the zeolite crystallization rate is expressed as a percentage by weight.

In Table V, the definitions of the abbreviations are as follows:
(a) Mod pH modifier
(b) pHi initial pH
(c) pHf final pH
(d) agit agitation
(e) t°C. temperature in °C.

Chemical analysis of samples 4c, 4g and 4i, when the impurities had been removed by dissolving the sample in boiling water, respectively demonstrated the presence of 0.9%, 0.4% and 17% by weight of titanium.

EXAMPLE 5

A series of 7 tests was carried out, evidencing that it was possible to use mixtures of pH modifiers or to include additives (Adj) for the purpose of changing the speed at which the pH increased, in order to produce purer crystals.

The tests are carried out according to the procedure of Example 4, using 2% of nuclei.

Table VI reports the number of moles of pH modifier or additive included in a reaction mixture containing $1(NH_4)_2SiF_6$, $0.25\ H_2TiF_6$, $0.1\ Pr_4NBr$ and $100\ H_2O$.

The quantities used per test corresponded to 1/15th of the composition indicated below, expressed in moles.

The reaction mixtures were heated without agitation, in an autoclave at 170° C. for 2 days.

The results obtained are reported in Table VI.

TABLE VI

| Example | pH Modifier | ADDITIVE | Molar Compositions | | Operating Conditions | | Results | |
|---|---|---|---|---|---|---|---|---|
| | | | Mod | ADJ | pHi | pHf | Yield $\rho$ | % MFI |
| 5a | UREA | — | 1.3 | — | 3.5 | 8.0 | 40 | 85% |
| 5b | UREA | FORMALDEHYDE | 1.3 | 1.0 | 3.0 | 8.0 | 40 | >95% |
| 5c | CYANAMIDE | — | 1.0 | — | 3.5 | 8.5 | 30 | 85% |
| 5d | CYANAMIDE | FORMALDEHYDE | 1.0 | 1.0 | 3.0 | 8.0 | 30 | >95% |
| 5e | CYANAMIDE HEXAMETHYLENETETRAMINE | — | 3.0 1.0 | — | 3.5 | 9.0 | 50 | >95% |
| 5f | UREA HEXAMETHYLENETETRAMINE | — | 1.0 1.0 | — | 3.5 | 8.5 | 45 | >95% |
| 5g | MELAMINE | FORMALDEHYDE | 1.0 | 1.0 | 3.0 | 7.5 | 40 | >95% |

From Table VI, it will be seen that the presence of the additive increased the rate of crystallization of the zeolite.

EXAMPLE 6

The two tests in this Example 6 corresponded to the preparation of MFI zeolites by the method of the invention, containing the element germanium in addition to the element silicon. In this event, it was preferable to use starting reagents which did not contain any alkali metal or alkaline earth metal cations, in order to minimize the formation of the corresponding insoluble germanates.

The molar composition of the reaction mixture is reported in Table VII. The quantities used in each test represented 15th of the composition, indicated in moles.

A solution of $H_2GeF_6$ was prepared by dissolving $GeO_2$ in a slight excess of a 40% aqueous solution of HF. The solution contained about 10 moles of water per mole $H_2GeF_6$.

This was added to a 31% aqueous solution of $H_2SiF_6$ (Prolabo, containing about 18.5 moles of water per mole of $H_2SiF_6$) in the proportions indicated in Table VII.

0.25 mole of tetrapropylammonium bromide and 1.5 moles of urea were dissolved in the mixture per mole of $H_2SiF_6$ introduced.

The pH of the mixture was then adjusted from 4 to 5 by adding a 40% aqueous solution of methylamine. The latter solution contained about 2.5 moles of water per mole of methylamine.

The reaction mixture was finally completed by adding water to provide a molar ratio of $H_2O/(Si+Ge)$ equal to 50. 1% of nuclei was added as in Example 4.

The reaction mixture was heated to 170° C. for one day.

The results obtained are reported in Table VII: the yield o of solid collected was calculated relative to the sum of $SiO_2+GeO_2$ used, and the zeolite crystallization rate is expressed as a percentage by weight.

When the crystals had been washed with hot water to remove impurities of the ammonium germanate type, the germanium content of the crystals was measured. It was found to be 2.5% and 10% respectively in samples 6a and 6b.

TABLE VII

| Example | pH Modifier | ADD-ITIVE | Molar Compositions $H_2SiF_6$ | $H_2GeF_6$ | Results Yield ρ | % MFI |
|---|---|---|---|---|---|---|
| 6a | UREA | — | 1 | 0.05 | 40% | >95% |
| 6b | UREA | — | 1 | 0.20 | 40% | 90% |

EXAMPLE 7

The two tests in this Example 7 corresponded to the preparation of MFI zeolites by the method of the invention, containing the elements tin or zirconium in addition to the element silicon.

Two reaction mixtures 7a and 7b, corresponding to the molar composition in test 4g, were prepared by the procedure described in Example 4, with the $H_2TiF_6$ replaced, respectively, by $Na_2SnF_6$ and $Na_2ZrF_6$ (STREM).

The reaction mixtures were heated to 170° C. for one day.

After crystallization under the conditions described in test 4, two solids were obtained by filtration and washed with hot water.

X-ray crystallographic analysis evidenced two MFI zeolites to be present, containing 3.1% of tin (sample 7a) and 1.3% of zirconium (sample 7b).

EXAMPLE 8

In this example, an MFI zeolite based on silicon oxide and titanium was prepared in a homogeneous medium by two methods: one method was to carry out the procedure in a state of weightlessness (8a) while the other was conducted under normal gravity (8b) as a comparison.

Two identical reaction mixtures 8a and 8b were prepared by the method described below.

The following materials were successively dissolved in 7.2 g of distilled water:

(i) 0.712 g of 99.99% by weight $(NH_4)_2SiF_6$ marketed by ALDRICH, (ii) 0.532 g of tetrapropylammonium bromide, $Pr_4NBr$ marketed by FLUKA, and (iii) 0.48 g of urea $O=C(NH_2)_2$ (over 99.5%) marketed by MERCK.

0 309 g of 53% aqueous solution of $H_2TiF_6$ (marketed by ALPHA) was added to the solution.

The pH was adjusted to 4 by stirring 0.04 g of a 28% aqueous ammonia solution therein. 0.0024 g of MFI crystals serving as nuclei (zeosillite) was finally added to the mixture.

The composition of the reaction medium, in moles, was as follows:

1 $(NH_4)_2SiF_6$; 0.25 $H_2TiF_6$; 0.5 $Pr_4NBr$; 2 $O=C(NH_2)_2$; 100 $H_2O$.

The two solutions 8a and 8b obtained were transferred quantitatively to two autoclaves coated with polytetrafluoroethane, having a nominal capacity of 18 ml. The fill ratio was thus about 45%.

The two autoclaves were maintained at ambient temperature for 10 days. The autoclave containing solution 8a was then placed into a state of weightlessness at $23°+/-5°$ C. on a satellite (microgravity=$10^{-5}$.g). One day later, it was heated at 170° C. for 68 hours (the time required to increase the temperature to 170° C. being 2 hours, 40 minutes). It was finally cooled to a temperature of $23°+/-5°$ C. over 28 hours. It was maintained in a state of weightlessness for 9 days at this latter temperature before being returned to earth, and was opened two days thereafter.

The autoclave containing solution 8b was subjected to the same operating conditions and with the same chronology as the first autoclave, except that the entire operation was carried out under gravity, on earth.

When the two autoclaves were opened, their contents were filtered and the solids recovered were analyzed by various methods (microscopy, X-ray, chemical analysis). The results are reported in Table VIII.

The pH of the solutions changed from 4 to 8.5 over the course of the synthesis.

TABLE VIII

| | 8a | | 8b | |
|---|---|---|---|---|
| Quantity of solid collected | 0.184 g | | 0.242 g | |
| Morphology and nature of phases | -Prisms combined in plates with 2 population of sizes (L = 100–150μ, W = T = 50μ, infrequent) (L = 10–40μ, W = 5–20μ T = 2–8μ, frequent) | MFI | Prisms combined in plates with 2 populations of sizes (L = 80μ, W = T = 20–30μ, infrequent) (L = 10–30μ, W = 5–15μ T = 1–10μ, frequent | MFI |
| | Needles (plentiful) (L = 100–3000μ) | microporous phase (Ti, Si, F) | Needles (very few) (L = 100–300μ) | phase unknown (Ti, Si, F) |
| Chemical compsition of prisms | $(Si_{96-x}Ti_xO_{192}).4Pr_4NF$ x = 0.2–0.5 | | $(Si_{96-x}TiO_{192}).4Pr_4NF$ x = 0.2–0.5 | |

L = length, W = width, T = thickness of prisms

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the production of an MFI zeolite, comprising (1) heating an aqueous, homogeneous reaction medium which comprises (a) an $M_{2/n}SiF_6$ complex (I), wherein M is a cation of valency n, a reagent (b) providing $OH^-$ ions by hydrothermal decomposition and a structuring agent (c), whereby a zeolite precipitate is formed therein, and (2) separating and calcining said precipitate to eliminate said structuring agent from the pores and channels of said zeolite.

2. The process as defined by claim 1, wherein said complex (I), M is a proton, an alkali or alkaline earth metal, a transition metal, or an ammonium or quaternary ammonium cation.

3. The process as defined by claim 2, wherein the molar ratio of said reagent (b) to the $(SiF_6^{2-})$ anion ranges from 0.25 to 8.0.

4. The process as defined by claim 3, wherein the molar ratio of said structuring agent (c) to the $(SiF_6^{2-})$ anion ranges from 0.04 to 3.0.

5. The process as defined by claim 4, the initial pH of said reaction medium ranging from 0 to 6.5.

6. The process as defined by claim 5, comprising heating said reaction medium to a temperature of at least 120° C.

7. The process as defined by claim 6, comprising calcining said precipitate at a temperature greater than 450° C.

8. The process as defined by claim 1, said reaction medium further comprising at least one $M_{2/n}T'F_6$ complex (II), wherein T' is titanium, germanium, zirconium and/or tin.

9. The process as defined by claim 8, wherein the molar ratio $T'F_6^{2-}/(SiF_6^{2-}+T'F_6^{2-})$ ranges from 0.001 to 0.50.

10. The process as defined by claim 9, said molar ratio ranging from 0.005 to 0.25.

11. The process as defined by claim 1, said reaction medium further comprising a pH modifier.

12. The process as defined by claim 11, wherein the molar ratio of said pH modifier to the $(SiF_6^{2-})$ anion is up to 8.0.

13. The process as defined by claim 12, said molar ratio being up to 6.0.

14. The process as defined by claim 3, wherein the molar ratio of said reagent (b) to the $(SiF_6^{2-})$ anion ranges from 1.0 to 4.0.

15. The process as defined by claim 4, wherein the molar ratio of said structuring agent (c) to the $(SiF_6^{2-})$ anion ranges from 0.08 to 1.5.

16. The process as defined by claim 1, wherein the molar ratio of the $H_2O$ to said $(SiF_6^{2-})$ anion ranges from 15 to 300.

17. The process as defined by claim 16, said molar ratio ranging from 25 to 200.

18. The process as defined by claim 1, wherein the pH of said reaction medium ranges from 2.0 to 5.5.

19. The process as defined by claim 18, said reaction medium comprising a pH-adjusting amount of ammonia, methylamine, dimethylamine, trimethylamine, ethylamine, diethylamine or triethylamine.

20. The process as defined by claim 1, said complex (I) comprising fluosilicic acid or an alkali or alkaline earth metal or ammonium fluosilicate.

21. The process as defined by claim 8, said complex (II) comprising an alkali or alkaline earth metal or ammonium fluotitanate, fluogermanate, fluozirconate and/or fluostannate.

22. The process as defined by claim 11, said pH modifier comprising substituted or unsubstituted urea, substituted or unsubstituted thiourea, substituted or unsubstituted cyanamide, hexamethylenediamine or melamine.

23. The process as defined by claim 22, said pH modifier comprising urea.

24. The process as defined by claim 1, said reaction medium comprising formaldehyde or salt thereof.

25. The process as defined by claim 1, said structuring agent (c) comprising:

(i) a tertiary amine of the formula (IV):

wherein $R_1$, $R_2$, and $R_3$, which may be identical or different, are each a straight or branched alkyl radical having 1 to 6 carbon atoms;

(ii) a quaternary ammonium salt of the formula (V):

wherein $R_1$, $R_2$, $R_3$, and $R_4$, which may be identical or different, are each a straight or branched alkyl radical having 1 or 6 carbon atoms; or (iii) a compound of either formulae (IV) and (V) wherein the nitrogen atom has been replaced by a phosphorus atom.

26. The process as defined by claim 1, carried out in the presence of nuclei comprising MFI zeolite seed crystals.

27. The process as defined by claim 1, wherein the final pH of the reaction mixture ranges from 6.5 to 12.0.

28. The process as defined by claim 27, said final pH ranging from 7.0 to 10.0.

29. The process as defined by claim 1, carried out under essentially zero gravity conditions.

30. The MFI zeolite product of the process as defined by claim 1.

31. The MFI zeolite product of the process as defined by claim 8.

* * * * *